US012258927B1

(12) United States Patent
Oshima et al.

(10) Patent No.: US 12,258,927 B1
(45) Date of Patent: Mar. 25, 2025

(54) INTERNAL COMBUSTION ENGINE CONTROL DEVICE

(71) Applicant: TOYOTA JIDOSHA KABUSHIKI KAISHA, Toyota (JP)

(72) Inventors: Tomoya Oshima, Susono (JP); Masayoshi Nakagawa, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/731,566

(22) Filed: Jun. 3, 2024

(30) Foreign Application Priority Data

Sep. 7, 2023 (JP) ................................ 2023-145281

(51) Int. Cl.

*F02M 26/05* (2016.01)
*F02B 29/04* (2006.01)
*F02D 41/00* (2006.01)
*F02M 26/23* (2016.01)
*F02M 26/35* (2016.01)

(52) U.S. Cl.

CPC ......... *F02M 26/05* (2016.02); *F02B 29/0406* (2013.01); *F02D 41/005* (2013.01); *F02M 26/23* (2016.02); *F02M 26/35* (2016.02); *F02D 2200/50* (2013.01)

(58) Field of Classification Search

CPC ........ F02M 26/05; F02M 26/23; F02M 26/35; F02B 29/0406; F02D 41/005; F02D 2200/50

See application file for complete search history.

(56) References Cited

U.S. PATENT DOCUMENTS

| | | | | |
|---|---|---|---|---|
| 6,367,256 | B1 * | 4/2002 | McKee | F02M 26/47 60/605.2 |
| 7,131,263 | B1 * | 11/2006 | Styles | F02M 26/35 60/297 |
| 8,961,368 | B2 * | 2/2015 | Glugla | F02B 29/0468 477/110 |
| 9,010,112 | B2 * | 4/2015 | Palm | F02B 29/0468 60/599 |
| 9,127,607 | B2 * | 9/2015 | Glugla | F02D 41/1475 |
| 9,188,056 | B2 * | 11/2015 | Glugla | F02P 5/045 |
| 9,359,964 | B2 * | 6/2016 | Glugla | F02B 29/0406 |
| 9,546,590 | B2 * | 1/2017 | Radmard | F02M 26/32 |

(Continued)

FOREIGN PATENT DOCUMENTS

| | | |
|---|---|---|
| JP | 2006-132407 A | 5/2006 |
| JP | 2006-299989 A | 11/2006 |

(Continued)

*Primary Examiner* — Jesse S Bogue
(74) *Attorney, Agent, or Firm* — SoraIP, Inc.

(57) ABSTRACT

When EGR gases are introduced into the intake passage through EGR passage, the control device determines whether or not the condensed water is generated in the merging portion of the intake passage, which is the portion to which EGR passage is connected. The control device determines whether or not the internal combustion engine is in a high-load operation based on the engine speed and the engine torque. The control device determines that the condensed water is generated in the merging portion of the intake passage, and reduces the amount of the condensed water collected by the collection device when the internal combustion engine is determined to be in a high-load operation.

4 Claims, 6 Drawing Sheets

(56) References Cited

U.S. PATENT DOCUMENTS

| | | | | |
|---|---|---|---|---|
| 9,863,307 | B2 * | 1/2018 | Smiljanovski | F04D 29/685 |
| 10,914,229 | B2 * | 2/2021 | Ruona | F02B 29/0468 |
| 2007/0039598 | A1 | 2/2007 | Wakayama et al. | |

FOREIGN PATENT DOCUMENTS

| | | | |
|---|---|---|---|
| JP | 2007-051587 | A | 3/2007 |
| JP | 2017-057788 | A | 3/2017 |

* cited by examiner

INTERNAL COMBUSTION ENGINE CONTROL DEVICE

CROSS-REFERENCE TO RELATED APPLICATION

This application claims priority to Japanese Patent Application No. 2023-145281 filed on Sep. 7, 2023, incorporated herein by reference in its entirety.

BACKGROUND

1. Technical Field

The present disclosure relates to an internal combustion engine control device to be applied to an internal combustion engine using gaseous fuel as fuel.

2. Description of Related Art

Japanese Unexamined Patent Application Publication No. 2017-57788 (JP 2017-57788 A) discloses an internal combustion engine provided with an EGR device for recirculating part of exhaust gas discharged from a cylinder to an intake passage. The exhaust gas recirculated to the intake passage by the EGR device will be referred to as "EGR gas". "EGR" is an abbreviation for "Exhaust Gas Recirculation".

The EGR device includes an EGR passage connected to the intake passage, an EGR cooler configured to cool the EGR gas flowing through the EGR passage, and a collection device configured to collect condensed water generated in the EGR passage. The EGR passage is connected to a portion of the intake passage upstream of an intercooler. A control device configured to control the internal combustion engine reduces the efficiency of cooling of the EGR gas by the EGR cooler when determination is made that condensed water is generated in the intake passage due to cooling by the intercooler. Thus, the control device suppresses the generation of condensed water in the intake passage. As a result, it is possible to suppress the inflow of the condensed water into the cylinder through the intake passage.

SUMMARY

In an internal combustion engine in which liquid fuel such as gasoline is introduced into a cylinder, an increase in temperature in the cylinder can be suppressed as the liquid fuel is vaporized in the cylinder. In an internal combustion engine in which gaseous fuel such as hydrogen is introduced into a cylinder, however, the effect of suppressing an increase in temperature in the cylinder along with the introduction of the fuel cannot be expected as compared with the case where the liquid fuel is introduced into the cylinder. Therefore, the temperature in the cylinder is likely to increase.

An internal combustion engine control device for solving the above problem is applied to an internal combustion engine including a cylinder, an intake passage through which air introduced into the cylinder flows, an exhaust passage through which exhaust gas discharged from the cylinder flows, and an exhaust gas recirculation device configured to recirculate, into the intake passage, part of the exhaust gas flowing through the exhaust passage as exhaust gas recirculation gas. The internal combustion engine is configured such that gaseous fuel is supplied into the cylinder.

The exhaust gas recirculation device includes an exhaust gas recirculation passage that is connected to the intake passage and through which the exhaust gas recirculation gas flows toward the intake passage, and a collection device configured to collect condensed water generated in the exhaust gas recirculation passage.

The internal combustion engine control device is configured to:

- determine, when the exhaust gas recirculation gas is introduced into the intake passage via the exhaust gas recirculation passage, whether condensed water is generated in a joining portion of the intake passage to which the exhaust gas recirculation passage is connected; determine whether the internal combustion engine is in a high-load operation based on a rotational speed of an output shaft of the internal combustion engine and an output torque of the internal combustion engine; and
- reduce an amount of collection of the condensed water by the collection device when determination is made that the condensed water is generated in the joining portion of the intake passage and the internal combustion engine is in the high-load operation.

The above internal combustion engine control device has an effect of suppressing the increase in temperature in the cylinder when the internal combustion engine is in the high-load operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment of an internal combustion engine control device will be described with reference to FIGS. 1 to 3.

Figure 1:
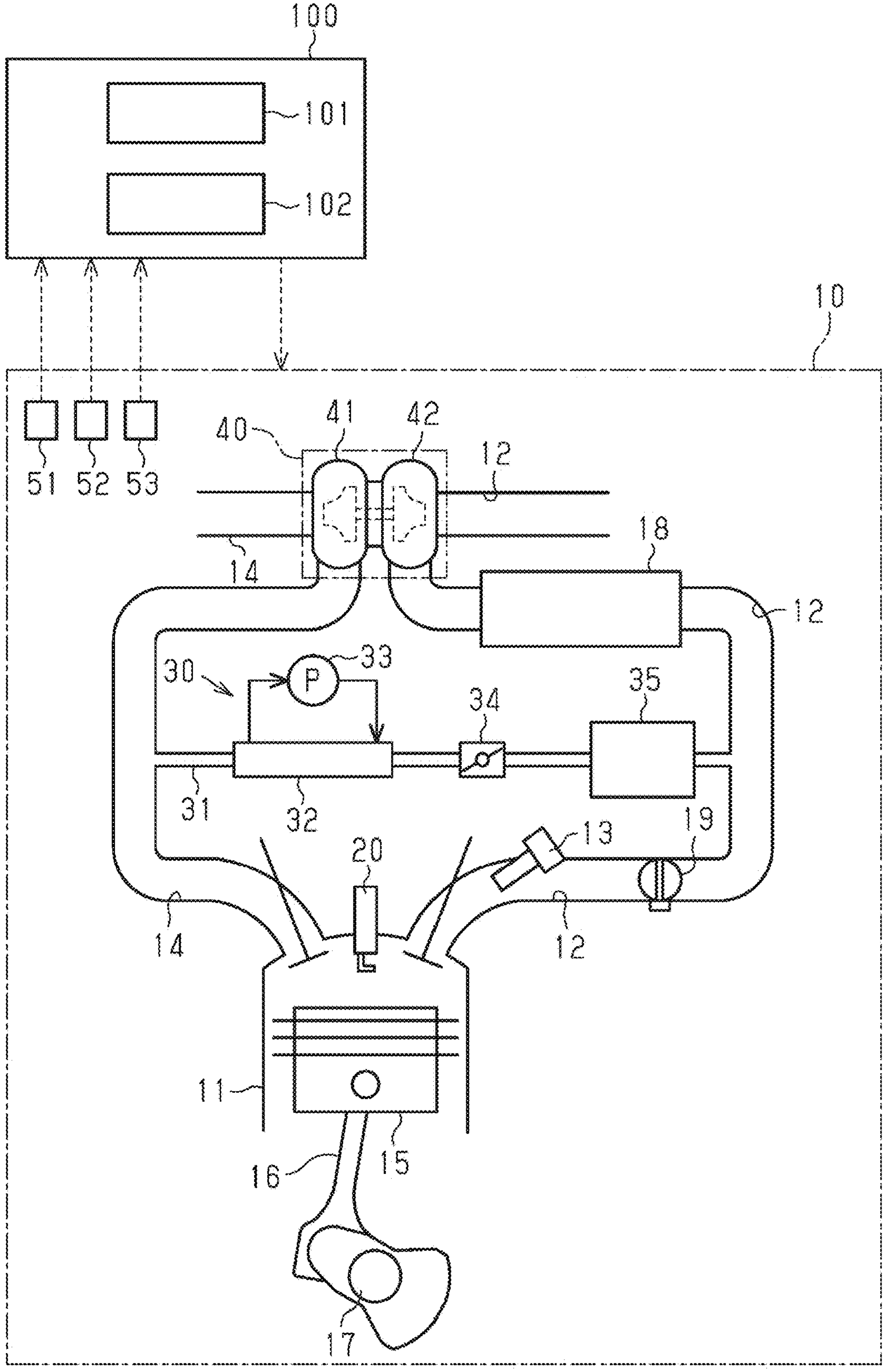
FIG. 1 is a configuration diagram illustrating an internal combustion engine control device according to a first embodiment and an internal combustion engine to which the internal combustion engine control device is applied.

FIG. 1 illustrates an internal combustion engine 10 mounted on a vehicle and a control device 100 applied to the internal combustion engine 10. The control device 100 corresponds to an "internal combustion engine control device".

Internal Combustion Engine

The internal combustion engine 10 includes a plurality of cylinders 11, an intake passage 12, a plurality of fuel injection valves 13, and an exhaust passage 14. A piston 15 is accommodated in each of the plurality of cylinders 11. The plurality of pistons 15 are respectively connected to the crankshaft 17 via connecting rods 16. As the piston 15 reciprocates within the plurality of cylinders 11, the crankshaft 17 rotates. The crankshaft 17 corresponds to the "output shaft of the internal combustion engine 10".

The intake passage 12 is connected to the plurality of cylinders 11. The intake passage 12 is a passage through which air to be introduced into the plurality of cylinders 11 flows. The intake passage 12 is provided with an intercooler 18 that cools the air flowing through the intake passage 12. A throttle valve 19 for adjusting an amount of air to be introduced into the plurality of cylinders 11 is installed downstream of the intercooler 18 in the intake passage 12.

The plurality of fuel injection valves 13 inject the gaseous fuel supplied into the cylinder 11. An example of a gaseous fuel is hydrogen gas. In the example illustrated in FIG. 1, as the fuel injection valve 13, a port injection valve that injects gaseous fuel into a portion of the intake passage 12 downstream of the throttle valve 19 is illustrated. The internal combustion engine 10 may include an in-cylinder injection valve that directly injects gaseous fuel into the cylinder 11 as the fuel injection valve 13.

In each of the plurality of cylinders 11, the air-fuel mixture containing air and gaseous fuel is burned by the spark discharge of the spark plug 20. As a result, exhaust gas is generated in each of the plurality of cylinders 11. The exhaust gas is discharged from the inside of the plurality of cylinders 11 to the exhaust passage 14. The exhaust gas flows through the exhaust passage 14.

The internal combustion engine 10 includes a EGR device 30. EGR device 30 is a device that recirculates a part of the exhaust gas flowing through the exhaust passage 14 to the intake passage 12. The exhaust gas recirculated to the intake passage 12 via EGR device 30 is referred to as "EGR gas". EGR device 30 includes a EGR passage 31, a EGR cooler 32, a EGR bulb 34, and a collection device 35. EGR passage 31 is a passage through which EGR gases flow toward the intake passage 12. A first end of EGR passage 31 is connected to the exhaust passage 14. A second end of EGR passage 31 is connected to the intake passage 12. In the embodiment illustrated in FIG. 1, the second end of EGR passage 31 is connected to a part of the intake passage 12 between the intercooler 18 and the throttle valve 19. A portion of the intake passage 12 to which EGR passage 31 is connected is also referred to as a "merging portion".

EGR cooler 32 cools EGR gases flowing through EGR passage 31. As EGR cooler 32, for example, a water-cooled cooler is employed. EGR device 30 includes an electric pump 33 that adjusts the quantity of coolant supplied to EGR cooler 32. By adjusting the operation of the pump 33, the quantity of coolant supplied to EGR cooler 32 is adjusted. For example, when the quantity of the coolant supplied to EGR cooler 32 is increased, the cooling efficiency of EGR gases by EGR cooler 32 increases. On the other hand, when the feed rate is reduced, EGR cooler 32 is less efficient to cool EGR gases.

EGR valve 34 is installed in a part of EGR passage 31 that is lower than EGR cooler 32. EGR valve 34 is an electronically controlled valve. As EGR opening degree, which is the opening degree of EGR valve 34, increases, the flow rate of EGR gases in EGR passage 31 increases. That is, the recirculation flow rate of EGR gases to the intake passage 12 is increased.

The collection device 35 is disposed in EGR passage 31, downstream of EGR valve 34. The collection device 35 is disposed upstream of a part of EGR passage 31 that is connected to the intake passage 12. That is, the collection device 35 is installed so that EGR cooler 32 is positioned upstream of the collection device 35 in EGR passage 31. The collection device 35 is configured to collect the condensed water generated in EGR passage 31.

An example of the collection device 35 will be described. An example of the collection device 35 includes a first passage and a second passage arranged in parallel with each other, a collector arranged in the first passage, and an electronically controlled switching valve. Both the first passage and the second passage are connected to EGR passage 31. The switching valve is configured to adjust a distribution ratio of EGR gases flowing in the first passage among the EGR gases flowing in EGR passage 31. The collector collects the condensed water flowing into the first passage. In the collection device 35, the larger the distribution ratio, the higher the collection efficiency of the condensed water.

The internal combustion engine 10 includes an exhaust-driven supercharger 40. The supercharger 40 includes a turbine 41 disposed in the exhaust passage 14 and a compressor 42 disposed in the intake passage 12. The turbine 41 is disposed downstream of a part of the exhaust passage 14 to which EGR passage 31 is connected. The compressor 42 is disposed upstream of the intercooler 18 in the intake passage 12. The turbine 41 is operated by the flow rate of the exhaust gas flowing through the exhaust passage 14. The compressor 42 operates in synchronization with the turbine 41 to pressurize the air flowing through the intake passage 12.

The internal combustion engine 10 includes a plurality of sensors that output a signal corresponding to a detection result to the control device 100. The plurality of sensors includes, for example, a crank angle sensor 51, an air flow meter 52, and an outside air temperature sensor 53. The crank angle sensor 51 outputs a signal corresponding to the rotational speed of the crankshaft 17. The air flow meter 52 detects an amount of air flowing in a portion of the intake passage 12 upstream of the compressor 42. The outside air temperature sensor 53 detects a temperature outside the internal combustion engine 10.

The rotational speed of the crankshaft 17 based on the signal from the crank angle sensor 51 is referred to as an "engine rotational speed NE". The flow rate of the air based on the detection result of the air flow meter 52 is referred to as "intake air amount GA". The temperature based on the outside air temperature sensor 53 is referred to as "outdoor air temperature TMP".

Control Device

An example of the control device 100 is an electronic control device. The control device 100 includes a CPU 101 and memories 102. The memories 102 store various control programs executed by CPU 101. When CPU 101 executes the control program, the control device 100 can control the operation of the internal combustion engine 10. In the present embodiment, the control device 100 controls EGR device 30 in accordance with the operating area of the internal combustion engine 10.

Figure 2:
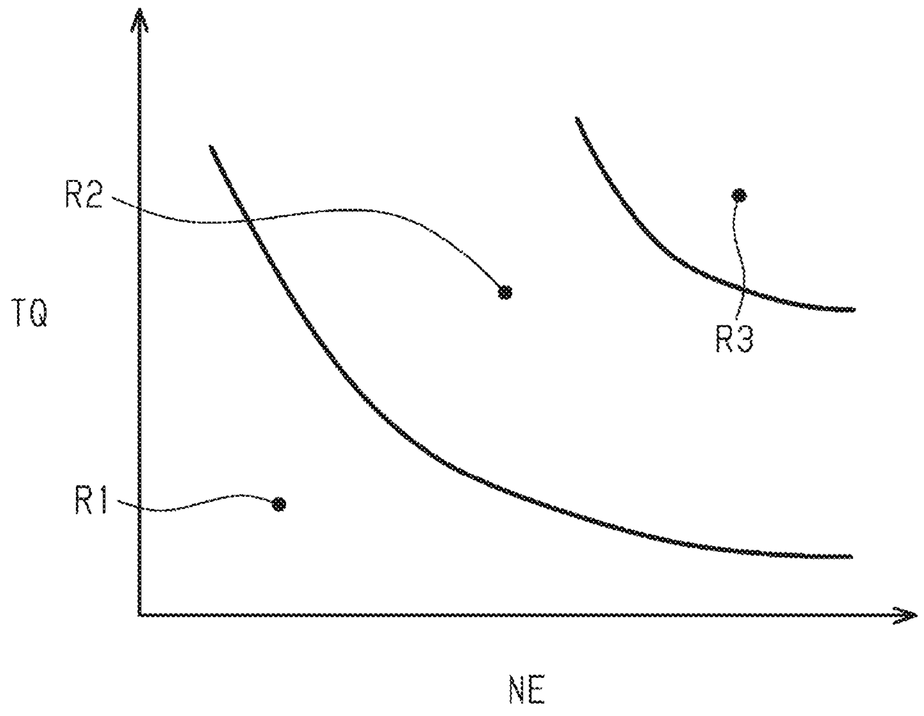
FIG. 2 is a map for identifying an operating region of the internal combustion engine shown in FIG. 1.

FIG. 2 illustrates a map for grasping an operation area of the internal combustion engine 10 based on the engine speed NE and the engine torque TQ. The engine torque TQ is the output torque of the internal combustion engine 10. The control device 100 calculates the engine torque TQ such that, for example, the accelerator operation amount increases.

The operating region of the internal combustion engine 10 can be divided into a low-load operation region R1, a medium-load operation region R2, and a high-load operation region R3. The low-load operation region R1 is an operation region in which the engine load, which is the load of the internal combustion engine 10, is small. When at least one of the engine speed NE and the engine torque TQ is relatively low, the control device 100 determines that the present operating range of the internal combustion engine 10 is the low-load operation region R1. The medium-load operation region R2 is an operation region in which the engine load is medium. When the engine speed NE and the engine torque TQ are moderate, the control device 100 determines that the present operating range of the internal combustion engine 10 is the medium-load operation region R2. The high-load operation region R3 is an operation region in which the engine load is relatively high. When both the engine speed NE and the engine torque TQ are relatively high, the control device 100 determines that the operating range of the present internal combustion engine 10 is the high-load operation region R3.

Here, by introducing EGR gases into the cylinder 11, the fuel injection quantity of the fuel injection valve 13 is reduced. Therefore, the temperature in the cylinder 11 is unlikely to increase. Further, by introducing the condensed water generated in EGR passage 31 into the cylinder 11, the effect of suppressing the temperature-rise in the cylinder 11 is further enhanced.

Even in the internal combustion engine 10 using hydrogen as a fuel, the temperature in the cylinder 11 does not increase significantly during low-load operation. Therefore, when the operating region of the internal combustion engine 10 is the low-load operation region R1, that is, when the internal combustion engine 10 is performing the low-load operation, there is little need to introduce EGR gases into the plurality of cylinders 11. However, when the operating region of the internal combustion engine 10 is not the low-load operation region R1, the temperature in the cylinder 11 tends to increase as compared with the case where the operating region is the low-load operation region R1. When the operating region of the internal combustion engine 10 is the high-load operation region R3, the temperature in the cylinder 11 is more likely to increase as compared with the case where the operating region is the medium-load operation region R2. Therefore, when the internal combustion engine 10 is in a mid-load operation, it is preferable to introduce EGR gases into the plurality of cylinders 11. However, in the case where the internal combustion engine 10 is in the middle load operation, it is less necessary to introduce the condensed water into the plurality of cylinders 11. On the other hand, when the internal combustion engine 10 is in a high-load operation, it is preferable to introduce both EGR gases and the condensed water into the plurality of cylinders 11.

Process for Controlling a EGR Device

Figure 3:
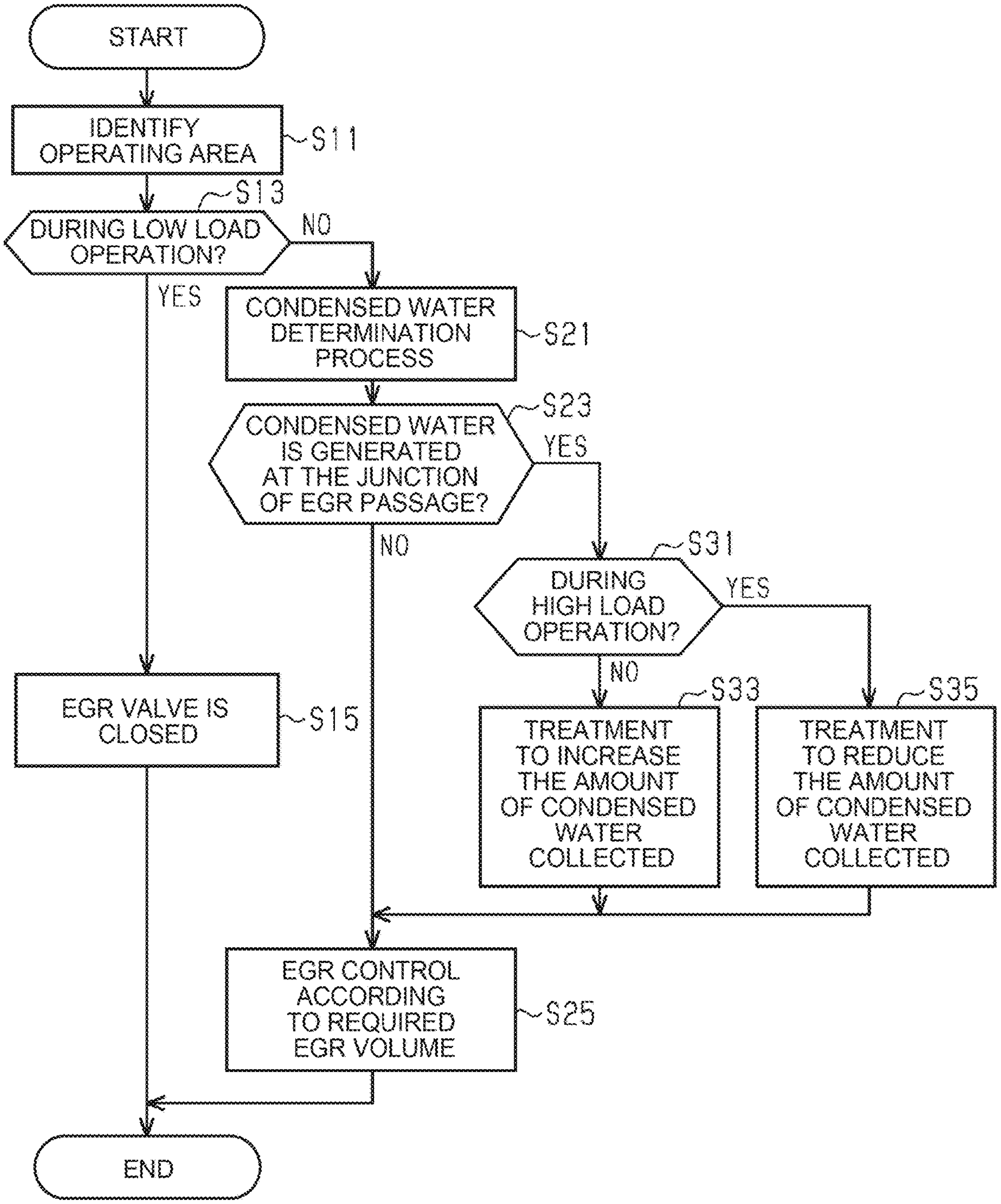
FIG. 3 is a flowchart illustrating a processing routine executed by the internal combustion engine control device according to the first embodiment.

Referring to FIG. 3, a process routine executed by the control device 100 when controlling EGR device 30 will be described. When the internal combustion engine 10 is in operation, the control device 100 repeatedly executes the present processing routine at predetermined intervals.

In S11, the control device 100 identifies the operating area of the internal combustion engine 10 using the map shown in FIG. 2. In the following S13, the control device 100 determines whether or not the internal combustion engine 10 is in a low-load operation. When the control device 100 determines that the internal combustion engine 10 is performing low-load operation (S13: YES), the process proceeds to S15. On the other hand, when the control device 100 determines that the internal combustion engine 10 is not performing the low-load operation (S13: NO), the process proceeds to S21.

In S15, the control device 100 closes EGR valve 34, thereby stopping the recirculation of EGR gases to the intake passage 12 by EGR device 30. Thereafter, the control device 100 temporarily ends this processing routine.

In S21, the control device 100 executes a process of determining the condensed water. In the determination process, the control device 100 calculates a first dew point TMPd1, which is a temperature at which the water vapor contained in EGR gases condenses. At this time, the control device 100 calculates the first dew point TMPd1 based on the temperature, the humidity, and the pressure of EGR passage 31. For example, the control device 100 calculates the first dew point TMPd1 such that the higher the temperature of EGR passage 31, the higher the temperature. The control device 100 calculates the first dew point TMPd1 such that the higher the humidity, the higher the temperature. The control device 100 calculates the first dew point TMPd1 such that the higher the pressure, the higher the temperature.

In the determination process, the control device 100 calculates a first gas temperature TMPg1 that is the temperature of the merging part of the intake passage 12 with EGR passage 31. The control device 100 calculates the first gas temperature TMPg1 based on the outside air temperature TMP, the temperature of EGR gas that has passed through EGR bulb 34, the intake air volume GA, and the recirculation flow rate of EGR gas. When a sensor for detecting the temperature of a part of EGR passage 31 that is downstream of EGR valve 34 is provided, the control device 100 can acquire the temperature of EGR gases based on the detection signal of the sensor. The control device 100 can derive the recirculation flow rate of EGR gases such that the larger the opening degree of EGR valve 34 is, the larger the value is. Then, the control device 100 calculates the first gas temperature TMPg1 such that the higher the outside air temperature TMP is, the higher the first gas temperature TMPg1 is. The control device 100 calculates the first gas temperature TMPg1 such that the smaller the intake air volume GA is, the higher the first gas temperature TMPg1 is. The control device 100 calculates the first gas temperature TMPg1 such that the higher the temperature of EGR gas is, the higher the first gas temperature TMPg1 is. The control device 100 calculates the first gas temperature TMPg1 such that the larger the recirculation flow rate of EGR gas is, the higher the first gas temperature TMPg1 is.

After calculating the first dew point TMPd1 and the first gas-temperature TMPg1, the control device 100 shifts the process to S23.

In S23, the control device 100 determines whether or not condensed water is generated in the merging part of the intake passage 12. For example, when the first gas-temperature TMPg1 is equal to or lower than the first dew point TMPd1, the control device 100 determines that condensed water is generated. On the other hand, when the first gas-temperature TMPg1 is higher than the first dew point TMPd1, the control device 100 determines that no condensed water is generated. When it is determined that condensed water is generated (S23: YES), the control device 100 shifts the process to S31. On the other hand, when the control device 100 determines that no condensed water is generated (S23: NO), the process proceeds to S25.

In S25, the control device 100 controls the opening degree of EGR valve 34 in accordance with the required EGR quantity. The required EGR is a required flow rate of EGR gases to the intake passage 12 via EGR passage 31. For example, the higher the load of the internal combustion engine 10, the larger the value is set as the required EGR quantity. The control device 100 may activate EGR valve 34 so that the opening degree increases as the required EGR volume increases. Then, the control device 100 ends this processing routine once.

In S31, the control device 100 determines whether or not the internal combustion engine 10 is in a high-load operation. When the control device 100 determines that the internal combustion engine 10 is performing high-load operation (S31: YES), the process proceeds to S35. On the other hand, when the control device 100 determines that the internal combustion engine 10 is not performing the high-load operation (S31: NO), it can determine that the internal combustion engine 10 is performing the medium-load operation, and thus the process proceeds to S33.

In S33, the control device 100 executes a process of increasing the amount of collected condensed water by the collection device 35. Assume that the collection device 35 has the above-described configuration. In this case, the control device 100 operates the switching valve so that the flow rate of EGR gases to the first passage in which the collector is disposed is increased as compared with the case where it is determined that the internal combustion engine 10 is performing the high-load operation. Then, the control device 100 shifts the process to S25.

In S35, the control device 100 executes a process of reducing the amount of collected condensed water by the collection device 35. Assume that the collection device 35 has the above-described configuration. In this case, the control device 100 operates the switching valve so as to reduce the flow rate of EGR gases to the first passage in which the collector is disposed, as compared with the case where it is determined that the internal combustion engine 10 is not performing the high-load operation. Thus, the control device 100 can reduce the amount of condensed water collected by the collection device 35. Then, the control device 100 shifts the process to S25.

Operation and Effect of the Present Embodiment (1-1) When EGR gases are introduced into the intake passage 12 via EGR passage 31, the control device 100 determines whether or not condensed water is generated at the merging part of the intake passage 12 (S23). The control device 100 determines whether or not the internal combustion engine 10 is performing high-load operation (S31). Then, when the control device 100 determines that the condensed water is generated at the merging part (S23: YES) and determines that the internal combustion engine 10 is performing the high-load operation (S31: YES), the control device reduces the amount of the condensed water collected by the collection device 35 (S35).

As a result, the quantity of the condensate flowing into the intake passage 12 through EGR passage 31 together with EGR gases increases. The condensed water flowing into the intake passage 12 flows into the plurality of cylinders 11 together with the air and EGR gases. In the cylinder 11, the condensed water is vaporized due to an increase in pressure in the cylinder 11 caused by combustion of the air-fuel mixture. At this time, the temperature rise in the cylinder 11 is suppressed by the latent heat of vaporization of the condensed water. Therefore, the control device 100 can prevent the temperature in the cylinder 11 from rising when the internal combustion engine 10 is performing the high-load operation.

(1-2) When the condensed water flows through the intake passage 12 or the condensed water flows into the cylinder 11, a change in the characteristics of the components of the internal combustion engine 10 in contact with the condensed water tends to proceed. Therefore, in the following cases, the control device 100 increases the amount of collected condensed water by the collection device 35 (S33): it is determined that the condensed water is generated at the merging part of the intake passage 12 (S23: YES), and it is determined that the internal combustion engine 10 is not performing the high-load operation (S31: NO).

As a result, the quantity of the condensed water flowing into the intake passage 12 from EGR passage 31 is reduced. Therefore, adhesion of condensed water to the components of the internal combustion engine 10 is suppressed. Moreover, since the internal combustion engine 10 is not in the high-load operation, even if the inflow of the condensed water into the cylinder 11 is reduced, the temperature-rise in the cylinder 11 is sufficiently suppressed by introducing EGR gases into the cylinder 11. Therefore, the control device 100 can suppress the progress of the change in the characteristics of the components of the internal combustion engine 10 while suppressing the temperature rise in the cylinder 11.

(1-3) In the internal combustion engine 10, hydrogen is supplied as fuel into a plurality of cylinders 11. The ignitability of hydrogen is higher than that of liquid fuels such as gasoline. Therefore, pre-ignition is likely to occur in the internal combustion engine 10. In order to suppress the occurrence of pre-ignition, it is preferable that the temperature in the cylinder 11 is not easily increased.

In this regard, when the internal combustion engine 10 is in a high-load operation, the control device 100 introduces the condensed water generated by cooling EGR gases into the plurality of cylinders 11. Thus, when the internal combustion engine 10 is in a high-load operation, the temperature rise in the plurality of cylinders 11 is suppressed. Therefore, the control device 100 can suppress the occurrence of pre-ignition in the plurality of cylinders 11.

Second Embodiment

A second embodiment of an internal combustion engine control device will be described with reference to FIG. 4 to FIG. 6. In the second embodiment, the structure and the like of the internal combustion engine to which the internal combustion engine control device is applied are different from those of the first embodiment. In the following description, portions different from those of the first embodiment will be mainly described, and the same components as those of the first embodiment will be denoted by the same reference numerals, and redundant description will be omitted.

Figure 4:
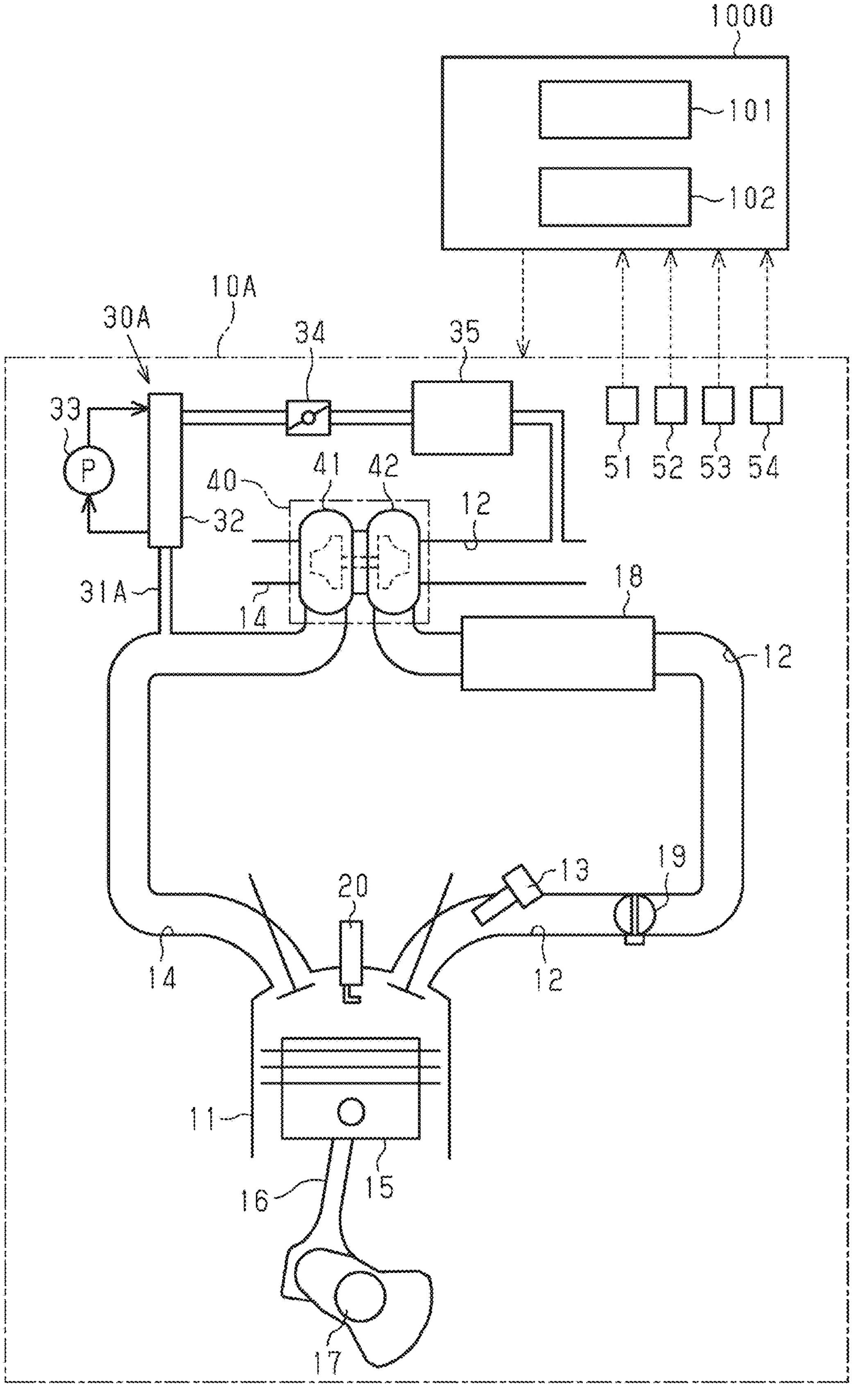
FIG. 4 is a configuration diagram illustrating an internal combustion engine control device according to a second embodiment and an internal combustion engine to which the internal combustion engine control device is applied.

FIG. 4 illustrates an internal combustion engine 10A mounted on vehicles and a control device 1000 to which an internal combustion engine 10A is applied. The control device 1000 corresponds to an "internal combustion engine control device".

Internal Combustion Engine

Similarly to the internal combustion engine 10, the internal combustion engine 10A includes a plurality of cylinders 11, an intake passage 12, an exhaust passage 14, and a supercharger 40. The internal combustion engine 10A includes a EGR device 30A.

Similar to the EGR device 30, the EGR device 30A is a device that recirculates a part of the exhaust gas flowing through the exhaust passage 14 as EGR gas into the intake passage 12. EGR device 30A includes a EGR passage 31A, a EGR cooler 32, a EGR bulb 34, and a collection device 35. EGR passage 31A is a passage through which EGR gases flow toward the intake passage 12. A first end of EGR passage 31A is connected to the exhaust passage 14. The second end of EGR passage 31A is connected to the intake passage 12. In the embodiment shown in FIG. 1, the first end of EGR passage 31A is connected to a part of the exhaust passage 14 upstream of the turbine 41. The second end of EGR passage 31A is connected to a part of the intake passage 12 upstream of the compressor 42.

The internal combustion engine 10A includes a plurality of sensors for outputting a signal corresponding to the detection result to the control device 1000. For example, the plurality of sensors includes a compressor rotational speed sensor 54 in addition to the crank angle sensor 51, the air flow meter 52, and the outside air temperature sensor 53. The compressor rotational speed sensor 54 detects the rotation speed of the blades of the compressor 42. The rotational speed based on the detection result of the compressor rotational speed sensor 54 is referred to as "compressor rotational speed NC".

Control Device

An example of the control device 1000 is an electronic control device. The control device 1000 includes a CPU 101 and memories 102 in the same manner as the control device 100.

Process for Controlling a EGR Device

Figure 5:
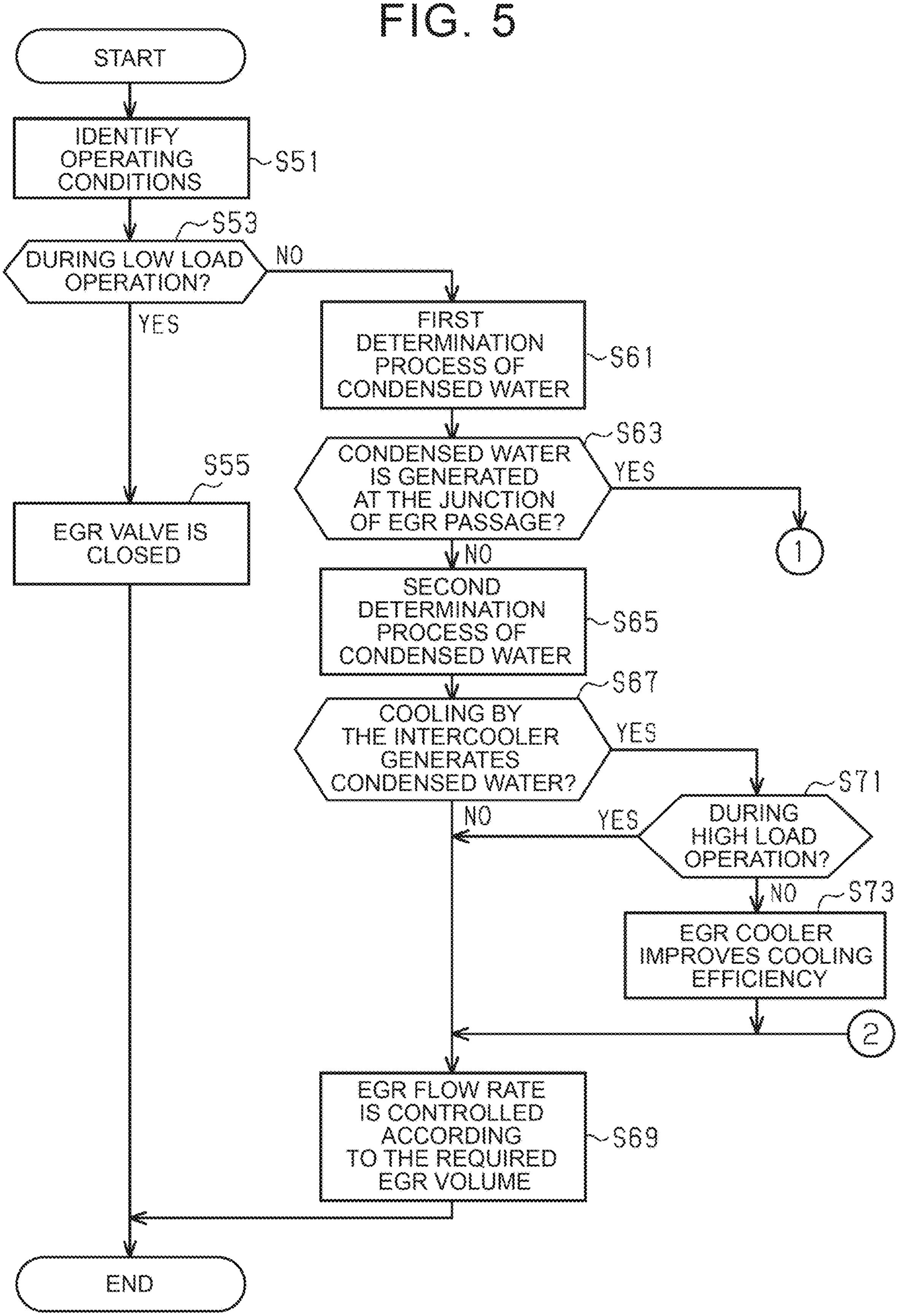
FIG. 5 is a flow chart showing a first half of a process routine executed by the internal combustion engine control device according to the second embodiment.
Figure 6:
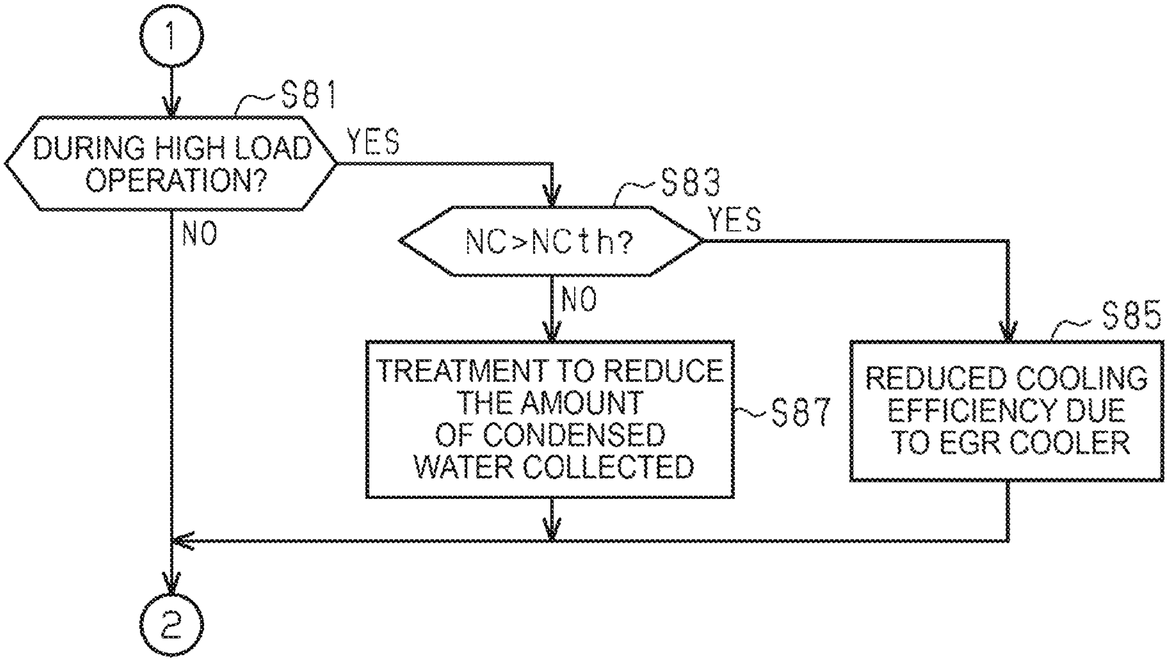
FIG. 6 is a flowchart illustrating a second half of a processing routine executed by the internal combustion engine control device according to the second embodiment.

Referring to FIGS. 5 and 6, a process routine executed by the control device 1000 when controlling EGR device 30A will be described. When the internal combustion engine 10A is in operation, the control device 1000 repeatedly executes this process routine at predetermined intervals.

In S51, the control device 1000 specifies the operating area of the internal combustion engine 10A in the same manner as in the above S11. In the following S53, the control device 1000 determines whether or not the internal combustion engine 10A is performing low-load operation. When the control device 1000 determines that the internal combustion engine 10A is performing low-load operation (S53: YES), the process proceeds to S55. On the other hand, when the control device 1000 determines that the internal combustion engine 10A is not performing the low-load operation (S53: NO), the process proceeds to S61.

In S55, the control device 1000 closes EGR valve 34 in the same manner as in the above S15. Thereafter, the control device 1000 temporarily ends this processing routine.

In S61, the control device 1000 executes the first determination process of the condensed water. The first determination process is the same as the process of determining the condensed water in S21. After calculating the first dew point TMPd1 and the first gas-temperature TMPg1, the control device 1000 shifts the process to S63.

In S63, the control device 1000 determines whether or not condensed water is generated at the merging part of the intake passage 12 with EGR passage 31A, similarly to the above-described S23. When the control device 1000 determines that condensed water is generated at the merging part (S63: YES), the process proceeds to S81. On the other hand, when the control device 1000 determines that no condensed water is generated in the merging part (S63: NO), the process proceeds to S65.

In S65, the control device 1000 executes a second determination process of the condensed water. In the second determination process, a second dew point TMPd2, which is a temperature at which the water vapor contained in the gas pressurized by the compressor 42 condenses, is calculated in the intake passage 12. When the gas pressurized by the compressor 42 is "pressurized gas", the control device 1000 calculates the second dew point TMPd2 based on the temperature, humidity, and pressure of the pressurized gas. For example, the control device 1000 calculates the second dew point TMPd2 so that the second dew point TMPd2 becomes higher as the temperature of the pressurized gas is higher. The control device 1000 calculates the second dew point TMPd2 so that the second dew point TMPd2 becomes higher as the humidity of the pressurized gas is higher. The control device 1000 calculates the second dew point TMPd2 such that the higher the supercharging pressure, which is the pressure of the pressurized gas, the higher the second dew point TMPd2.

In the second determination process, the control device 1000 calculates a second gas temperature TMPg2, which is the temperature of the pressurized gas cooled by the intercooler 18. For example, when a sensor for detecting the temperature of a part of the intake passage 12 downstream of the intercooler 18 is provided, the control device 1000 can calculate the second gas temperature TMPg2 based on the detection signal of the sensor.

After calculating the second dew point TMPd2 and the second gas-temperature TMPg2, the control device 1000 shifts the process to S67.

In S67, the control device 1000 determines whether or not condensed water is generated in the intake passage 12 by cooling the pressurized gas by the intercooler 18. For example, when the second gas-temperature TMPg2 is equal to or lower than the second dew point TMPd2, the control device 1000 determines that condensed water is generated. On the other hand, when the second gas-temperature TMPg2 is higher than the second dew point TMPd2, the control device 1000 determines that no condensed water is generated. When it is determined that condensed water is generated (S67: YES), the control device 1000 shifts the process to S71. On the other hand, when the control device 1000 determines that no condensed water is generated (S67: NO), the process proceeds to S69.

In S69, the control device 1000 controls the opening degree of EGR valve 34 in accordance with the required EGR quantity in the same manner as in the above S25. Then, the control device 1000 ends this processing routine once.

In S71, the control device 1000 determines whether or not the internal combustion engine 10A is performing high-load operation. When the control device 1000 determines that the internal combustion engine 10A is performing high-load operation (S71: YES), the process proceeds to S69. On the other hand, when the control device 1000 determines that the internal combustion engine 10A is not performing the high-load operation (S71: NO), it can determine that the internal combustion engine 10A is performing the medium-load operation, and thus the process proceeds to S73.

In S73, the control device 1000 executes a process of increasing the cooling-efficiency of EGR gases by EGR cooler 32. For example, the control device 1000 increases the cooling efficiency of EGR cooler 32 by increasing the quantity of the coolant supplied from the pump 33 to EGR cooler 32 as compared with the case where the internal combustion engine 10A does not perform the high-load operation. Thereafter, the control device 1000 shifts the process to S69.

In S81, the control device 1000 determines whether or not the internal combustion engine 10A is performing high-load operation. When the control device 1000 determines that the internal combustion engine 10A is performing high-load operation (S81: YES), the process proceeds to S83. On the other hand, when the control device 1000 determines that the internal combustion engine 10A is not performing the high-load operation (S81: NO), it can determine that the internal combustion engine 10A is performing the medium-load operation, and thus the process proceeds to S69.

In S83, the control device 1000 determines whether or not the compressor rotational speed NC is higher than the determination rotational speed NCth. A criterion for determining whether or not the condensed water may flow into the compressor 42 is set as the determination rotational speed NCth.

Here, when the compressor rotational speed NC is higher, there is a possibility that the wings may be damaged when the water droplets flowing into the compressor 42 collide with the wings of the compressor 42. On the other hand, when the compressor rotational speed NC is relatively low, even if the water droplets flowing into the compressor 42 collide with the blades of the compressor 42, the blades are not damaged. Therefore, it is preferable that the compressor rotational speed NC such that the blade of the compressor 42 is not damaged by the water droplets when the condensed water is introduced into the compressor 42 is set as the determination rotational speed NCth.

When the compressor rotational speed NC is higher than the determination rotational speed NCth (S83: YES), the control device 1000 shifts the process to S85. On the other hand, when the compressor rotational speed NC is equal to or lower than the determination rotational speed NCth (S83: NO), the control device 1000 shifts the process to S87.

In S85, the control device 1000 executes a process of decreasing the cooling efficiency of EGR gases by EGR cooler 32 as compared with a process of determining that the compressor rotational speed NC is equal to or lower than the determination rotational speed NCth. For example, the control device 1000 reduces the cooling efficiency of EGR cooler 32 by reducing the quantity of the coolant supplied from the pump 33 to EGR cooler 32. However, the control device 1000 adjusts the cooling efficiency of EGR cooler 32 so that the condensed water is generated by the cooling of the pressurized gas by the intercooler 18 while suppressing the generation of the condensed water in the merging part of the intake passage 12. Thereafter, the control device 1000 shifts the process to S69.

In S87, the control device 1000 performs a process of reducing the amount of collected condensed water by the collection device 35 in the same manner as in the above S35. Then, the control device 1000 shifts the process to S69.

Operation and Effect of the Present Embodiment

In the present embodiment, in addition to the operations and effects equivalent to those of the first embodiment (1-2) and (1-3), the following effects can be further obtained.

(2-1) When EGR gases are introduced into the intake passage 12 via EGR passage 31A, the control device 1000 determines whether or not condensed water is generated in the merging part of the intake passage 12 (S63). The control device 1000 determines whether or not the internal combustion engine 10A is performing high-load operation (S81). Then, in the following cases, the control device 1000 reduces the amount of collected condensed water by the collection device 35 (S87): when it is determined that condensed water is generated at the merging part of the intake passage 12 (S63: YES), and when it is determined that the internal combustion engine 10A is in a high-load operation (S81: YES), and when it is determined that the compressor rotational speed NC is equal to or lower than the determination rotational speed NCth (S83: NO).

As a result, the quantity of the condensate flowing into the intake passage 12 through EGR passage 31A together with EGR gases increases. The condensed water flowing into the intake passage 12 flows into the plurality of cylinders 11 together with the air and EGR gases. In the cylinder 11, the condensed water is vaporized due to an increase in pressure in the cylinder 11 caused by combustion of the air-fuel mixture. At this time, the temperature rise in the cylinder 11 is suppressed by the latent heat of vaporization of the condensed water. Therefore, the control device 1000 can suppress an increase in the temperature in the cylinder 11 when the internal combustion engine 10A is in a high-load operation.

(2-2) As described above, when the compressor rotational speed NC is higher than the determination rotational speed NCth, the components of the compressor 42 may be damaged by the condensed water when the condensed water generated in the merging part of the intake passage 12 flows into the compressor 42. Therefore, in the following cases, the control device 1000 lowers the cooling efficiency of EGR gases by EGR cooler 32: when it is determined that the condensed water is generated at the merging part of the intake passage 12 (S63: YES), and when it is determined that the internal combustion engine 10A is in the high-load operation (S81: YES), and when it is determined that the compressor rotational speed NC is higher than the determination rotational speed NCth (S83: YES).

As a result, the generation of condensed water at the merging portion of the intake passage 12 is suppressed. Consequently, when the compressor rotational speed NC is relatively high, the condensate is prevented from flowing into the compressor 42. Therefore, the control device 1000 can protect the components of the compressor 42.

Further, the control device 1000 adjusts the cooling efficiency of EGR cooler 32 so that the condensed water is generated in the intake passage 12 by the cooling of the pressurized gas by the intercooler 18 while suppressing the generation of the condensed water in the merging part of the intake passage 12. Therefore, even when the compressor rotational speed NC is higher than the determination rotational speed NCth, the control device 1000 can supply the condensed water generated in the intake passage 12 by the cooling of the pressurized gas by the intercooler 18 into the plurality of cylinders 11. Therefore, the control device 1000 can suppress the temperature rise in the cylinder 11 during the high-load operation of the internal combustion engine 10A while protecting the components of the compressor 42.

(2-3) The control device 1000 determines that the condensed water is not generated in the merging part of the intake passage 12 (S63: NO), and determines that the condensed water is generated in the intake passage 12 by the cooling of the pressurized gas by the intercooler 18 (S67: YES), and further, when it is determined that the internal combustion engine 10A is not performing the high-load operation (S71: NO), the following process is executed. That is, the control device 1000 increases the cooling efficiency of EGR gases by EGR cooler 32 as compared with the case where it is determined that the internal combustion engine 10A is performing the high-load operation.

This reduces the amount of condensed water generated by the cooling of the pressurized gas by the intercooler 18. Consequently, the control device 1000 can reduce the quantity of the condensed water flowing into the plurality of cylinders 11 from the intake passage 12 when the internal combustion engine 10A is in the medium-load operation.

(2-4) On the other hand, the control device 1000 determines that the condensed water is not generated in the merging part of the intake passage 12 (S63: NO), and determines that the condensed water is generated in the intake passage 12 by the cooling of the pressurized gas by the intercooler 18 (S67: YES), and further, when it is determined that the internal combustion engine 10A is performing the high-load operation (S71: YES), the following process is executed. That is, the control device 1000 reduces the cooling efficiency of EGR gases by EGR cooler 32 as compared with the case where it is determined that the internal combustion engine 10A is not performing the high-load operation.

This increases the amount of condensed water generated by the cooling of the pressurized gas by the intercooler 18. Therefore, the amount of condensed water flowing into the plurality of cylinders 11 from the intake passage 12 increases. Therefore, the control device 1000 can suppress an increase in the temperature in the cylinder 11 when the internal combustion engine 10A is in a high-load operation.

Example of Change

The above-described plurality of embodiments can be modified as follows. The above-described embodiments and the following modifications can be implemented in combination with each other as long as they are not technically contradictory.

- In the second embodiment, in the following cases, the control device 1000 may increase the cooling efficiency of EGR gas by EGR cooler 32 regardless of whether or not the internal combustion engine 10A is performing the high-load operation: in a case where it is determined that the condensed water is generated in the intake passage 12 by the cooling of the pressurized gas by the intercooler 18 (S67: YES).
- In the second embodiment, in the following cases, the control device 1000 does not need to reduce the amount of collected condensed water by the collection device 35: it is determined that condensed water is generated in the merging part of the intake passage 12 (S63: YES), and it is determined that the internal combustion engine 10A is in a high-load operation (S81: YES), and further, it is determined that the compressor rotational speed NC is equal to or less than the determination rotational speed NCth (S83: NO).
- In the first embodiment, the internal combustion engine 10 may be an internal combustion engine that does not include the supercharger 40. In this case, the intercooler 18 may not be provided in the intake passage 12.
- The number of cylinders included in the internal combustion engine 10, 10A may be one or more.
- The control devices 100 and 1000 include a CPU and a ROM, and are not limited to those that execute software-processing. That is, the control devices 100 and 1000 may have any of the following configurations (a), (b), and (c).

(a) The control devices 100 and 1000 include one or more processors that execute various kinds of processing in accordance with a computer program. The processor includes CPU and memories such as RAM and ROM. The memory stores a program code or a command configured to cause the CPU to execute the process. Memory, or computer readable media, includes any available media that can be accessed by a general purpose or special purpose computer.

(b) The control devices 100 and 1000 include one or more dedicated hardware circuits for executing various processes. Dedicated hardware circuits may include, for example, application-specific integrated circuits, i.e., ASIC or FPGA. Note that ASIC is an abbreviation of "Application Specific Integrated Circuit", and FPGA is an abbreviation of "Field Programmable Gate Array".

(c) The control devices 100 and 1000 include a processor that executes a part of various kinds of processing in accordance with a computer program, and dedicated hardware circuits that execute the remaining processing among the various kinds of processing.

It should be noted that the expression "at least one" as used herein means "one or more" of the desired options. As an example, the expression "at least one" as used herein means "only one option" or "both of two options" if the number of options is two. As another example, the expression "at least one" as used herein means "only one option" or "any combination of two or more options" if the number of options is three or more.

What is claimed is:

1. An internal combustion engine control device to be applied to an internal combustion engine including a cylinder, an intake passage through which air introduced into the cylinder flows, an exhaust passage through which exhaust gas discharged from the cylinder flows, and an exhaust gas recirculation device configured to recirculate, into the intake passage, part of the exhaust gas flowing through the exhaust passage as exhaust gas recirculation gas, the internal combustion engine being configured such that gaseous fuel is supplied into the cylinder, wherein:

the exhaust gas recirculation device includes an exhaust gas recirculation passage that is connected to the intake passage and through which the exhaust gas recirculation gas flows toward the intake passage, and a collection device configured to collect condensed water generated in the exhaust gas recirculation passage; and the internal combustion engine control device is configured to determine, when the exhaust gas recirculation gas is introduced into the intake passage via the exhaust gas recirculation passage, whether condensed water is generated in a joining portion of the intake passage to which the exhaust gas recirculation passage is connected, determine whether the internal combustion engine is in a high-load operation based on a rotational speed of an output shaft of the internal combustion engine and an output torque of the internal combustion engine, and reduce an amount of collection of the condensed water by the collection device when determination is made that the condensed water is generated in the joining portion of the intake passage and the internal combustion engine is in the high-load operation.

2. The internal combustion engine control device according to claim 1, wherein:

the internal combustion engine includes a turbocharger including a turbine provided in the exhaust passage and a compressor configured to operate in synchronization with the turbine and provided in the intake passage, and an intercooler disposed downstream of the compressor in the intake passage and configured to cool air flowing through the intake passage;

the exhaust gas recirculation device includes an exhaust gas recirculation cooler disposed upstream of the collection device in the exhaust gas recirculation passage and configured to cool the exhaust gas recirculation gas flowing through the exhaust gas recirculation passage;

the joining portion is positioned at a portion of the intake passage upstream of the intercooler; and the internal combustion engine control device is configured to determine whether a compressor rotational speed that is a rotational speed of the compressor is higher than a determination rotational speed, and when determination is made that the condensed water is generated in the joining portion, the internal combustion engine is in the high-load operation, and the compressor rotational speed is higher than the determination rotational speed, reduce an efficiency of cooling of the exhaust gas recirculation gas by the exhaust gas recirculation cooler as compared with a case where determination is made that the compressor rotational speed is equal to or lower than the determination rotational speed.

3. The internal combustion engine control device according to claim 2, wherein the internal combustion engine control device is configured to reduce the amount of collection of the condensed water by the collection device when determination is made that the condensed water is generated in the joining portion, the internal combustion engine is in the high-load operation, and the compressor rotational speed is equal to or lower than the determination rotational speed.

4. The internal combustion engine control device according to claim 2, wherein the internal combustion engine control device is configured to:

determine whether condensed water is generated in the intake passage due to cooling by the intercooler; and when determination is made that the condensed water is not generated in the joining portion, the condensed water is generated in the intake passage due to the cooling by the intercooler, and the internal combustion engine is not in the high-load operation, increase the efficiency of cooling of the exhaust gas recirculation gas by the exhaust gas recirculation cooler as compared with a case where determination is made that the internal combustion engine is in the high-load operation.

* * * * *